Oct. 4, 1960 P. SCHLUMBOHM 2,954,919

METHOD AND APPARATUS FOR INCREASING THE PUMPING EFFECT OF A ROTATING DISC

Filed Feb. 26, 1958

INVENTOR

Peter Schlumbohm

United States Patent Office 2,954,919

Patented Oct. 4, 1960

2,954,919

METHOD AND APPARATUS FOR INCREASING THE PUMPING EFFECT OF A ROTATING DISC

Peter Schlumbohm, 41 Murray St., New York 7, N.Y.

Filed Feb. 26, 1958, Ser. No. 717,759

2 Claims. (Cl. 230—118)

The present invention refers to a method and apparatus for increasing the pumping effect of a rotating disc which rotates in a fluid. The invention is illustrated by way of example in Fig. 1 to Fig. 3 of the accompanying drawings.

A rotating disc as a pumping means was pioneered by Tesla. The effect of such a rotating disc is due to friction and centrifugal force.

Following my invention, the pumping effect of a rotating disc is increased by adding the pressure effect of a propeller.

Following my invention, a flexible disc is applied. This flexible disc is, during the rotation, subjected to the influence of two walls which are arranged 180° apart, one above the disc and one below the disc.

Figure 1:
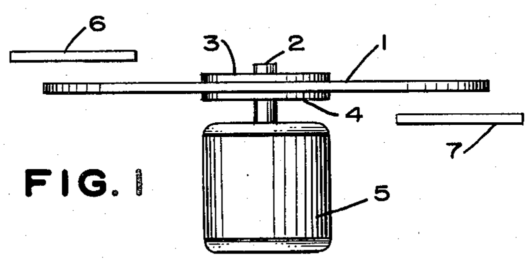
Fig. 1 shows a side view of the apparatus.

Fig. 1 shows the disc 1 mounted between an upper gripping plate 3 and a lower gripping plate 4 on a shaft 2 of a motor 5. The one wall 6 is arranged above the disc; the second wall 7 is arranged below the disc.

Figure 2:
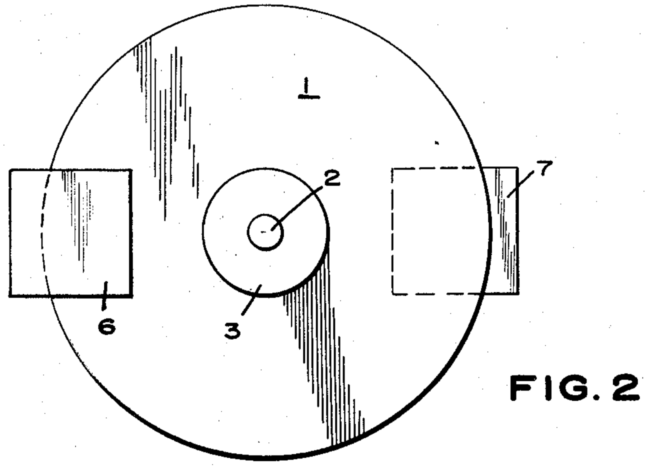
Fig. 2 is a top view of Fig. 1.

As shown in Fig. 2, these walls, with their surface parallel the surface of the disc, extend over only a fraction of the surface of the disc.

Figure 3:
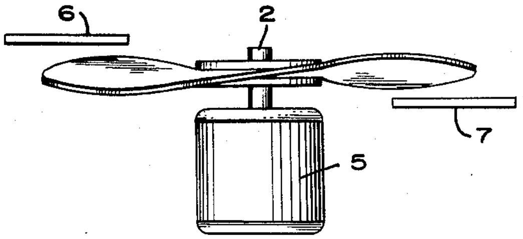
Fig. 3 is a side view of the apparatus as shown in Fig. 1, but showing additionally the effect of the invention.

As shown in Fig. 3, the rotating disc becomes twisted in the zone of the walls 6 and 7. I have coined such walls in a previous patent a co-pumping wall. The twisting of the disc is due to the Bernoulli effect. A vacuum is created between the co-pumping wall and the surface of the disc.

Thus a propeller pressure effect is added to the friction effect and the centrifugal effect of the rotating disc.

The continuously deforming and reforming of the disc and its movement within a fluid can be likened to a flounder moving through water, and such a disc operation may be described as a "floundering disc."

The increased pumping power is especially effective for pumping air but the method and apparatus are not limited to this fluid.

I claim as my invention:

1. Apparatus for increasing the pumping effect of a rotating disc for pumping the surrounding fluid comprising a rotatable shaft, a flexible disc affixed at its center to said shaft so as to rotate with said shaft, said disc having an upper surface and a lower surface and said surfaces having a center zone around said shaft and an outer zone extending from the periphery towards said center zone, and a plurality of stationary co-pumping wall elements in a fixed position relative to said disc, each of said elements lying in a plane substantially normal to the axis of said shaft and in the outer zone of said disc and in close proximity to one of said surfaces of said disc, and each of said elements having a surface forming a relatively small portion as compared to the surface of said disc, and each of said wall elements substantially diametrically arranged opposed to the other of said wall elements whereby the part of said disc which approaches, passes and leaves the location of each of said wall elements will move in a sinuous pattern leaving the plane of rotation and returning to it thereby augmenting the friction between the surface of said disc and the surrounding fluid.

2. The apparatus of claim 1, further characterized by one of said wall elements confronting the upper surface of said disc, and said substantially diametrically opposed wall element confronting the lower surface of said disc.

References Cited in the file of this patent

UNITED STATES PATENTS

| | | |
|---|---|---|
| 2,655,310 | Schlumbohm | Oct. 13, 1953 |
| 2,706,016 | Schlumbohm | Apr. 12, 1955 |
| 2,787,412 | Schlumbohm | Apr. 2, 1957 |

FOREIGN PATENTS

| | | |
|---|---|---|
| 162,142 | Austria | Apr. 15, 1948 |
| 751,591 | Great Britain | June 27, 1956 |